(12) United States Patent
Taima et al.

(10) Patent No.: US 7,439,991 B1
(45) Date of Patent: Oct. 21, 2008

(54) IMAGE INFORMATION PRESENTATION SYSTEM, IMAGE INFORMATION PRESENTATION METHOD, MEDIUM STORING IMAGE INFORMATION PRESENTATION SYSTEM PROGRAM, AND SIGNAL THEREFOR

(75) Inventors: Kenji Taima, Moriguchi (JP); Teruhiro Yamada, Katano (JP); Tetsuya Enomoto, Yawata (JP); Ryuhei Amano, Hirakata (JP); Satoshi Takemoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/409,894

(22) Filed: Oct. 1, 1999

(30) Foreign Application Priority Data

Oct. 2, 1998 (JP) ................................. 10-280884
Oct. 2, 1998 (JP) ................................. 10-280885

(51) Int. Cl.
*G09G 5/26* (2006.01)
(52) U.S. Cl. ....................... 345/670; 345/723; 345/730; 345/838
(58) Field of Classification Search ................ 345/670, 345/671, 638, 723, 730, 731, 732, 127, 112, 345/439, 721, 475, 705, 706, 704, 838; 707/501.1
See application file for complete search history.

(56) References Cited

U.S. PATENT DOCUMENTS

| | | | | |
|---|---|---|---|---|
| 5,729,252 A | * | 3/1998 | Fraser | 707/500 |
| 5,865,519 A | * | 2/1999 | Maass | 353/28 |
| 5,875,305 A | * | 2/1999 | Winter et al. | 709/231 |
| 6,078,726 A | * | 6/2000 | Gotoh et al. | 386/117 |
| 6,091,408 A | * | 7/2000 | Treibitz et al. | 345/753 |
| 6,144,972 A | * | 11/2000 | Abe et al. | 707/501 |
| 6,181,342 B1 | * | 1/2001 | Niblack | 345/635 |

* cited by examiner

*Primary Examiner*—Matthew Luu
*Assistant Examiner*—Thu-Thao Hawan
(74) *Attorney, Agent, or Firm*—Arent Fox LLP

(57) ABSTRACT

An image information presentation system, wherein when all image information is read from a material memory 101 and is reduced by a listing control means 105 to be listed on a display means 102, the image information read by the listing control means 105 is determined whether to be a still image or a moving image. If the image information is a moving image, thumbnails (reduced image) is driven in a listing state.

Further, the image information presentation system, comprises a template listing section 72 for listing the templates and parts image information in the material memory 1 on the display means 4, a position specification means 5 for specifying the listed image information at a plural of positions on the display screen of the display means 4, and a presentation document preparation means 12 for storing all image information specified in a template constructed in relating decorative frame for storing image between a plural of pages and preparing a presentation document.

16 Claims, 14 Drawing Sheets

Fig. 8
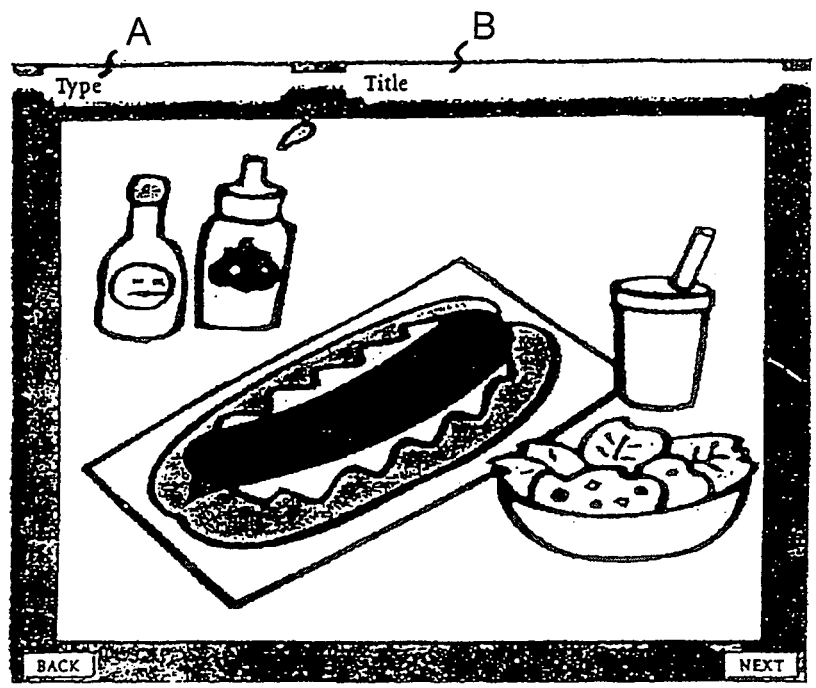
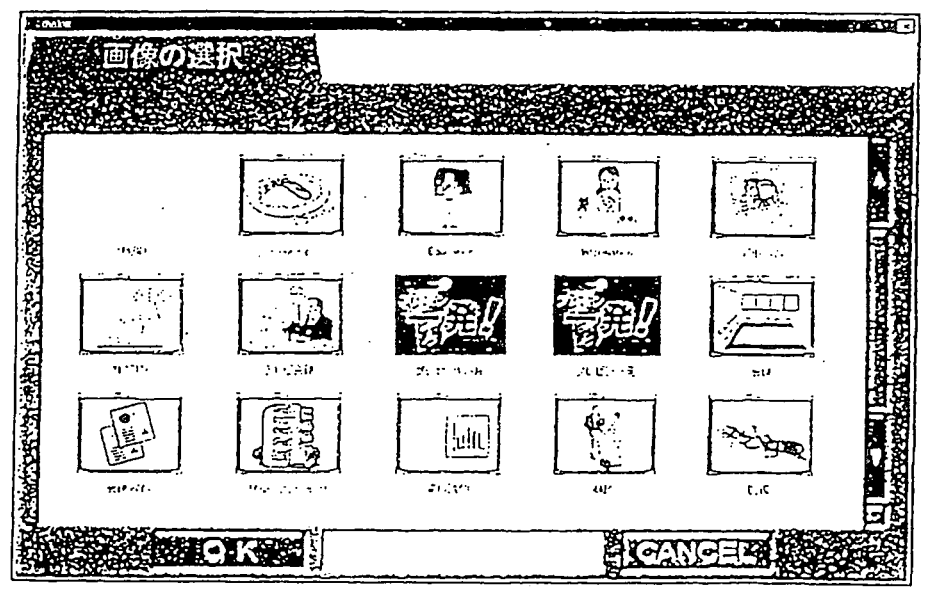
Fig. 9

Fig. 14
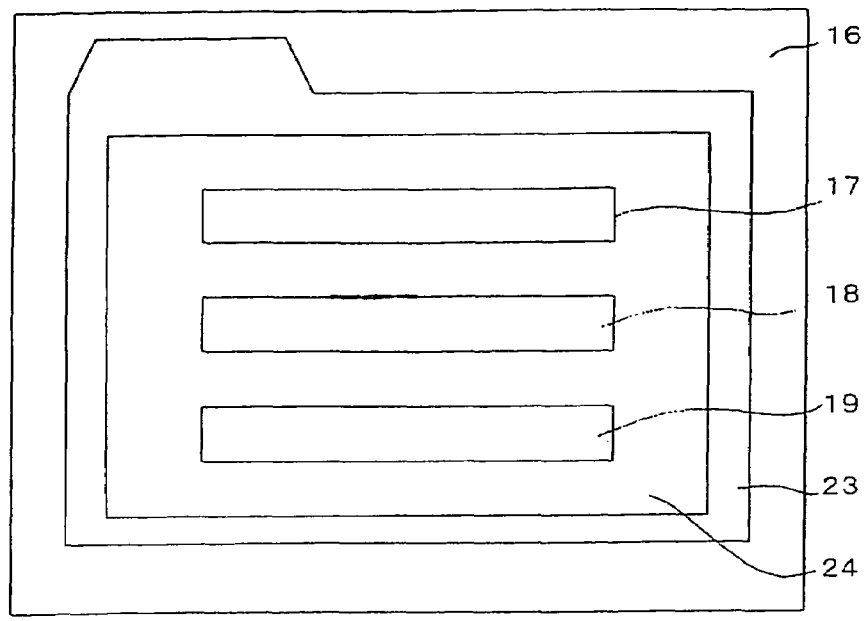
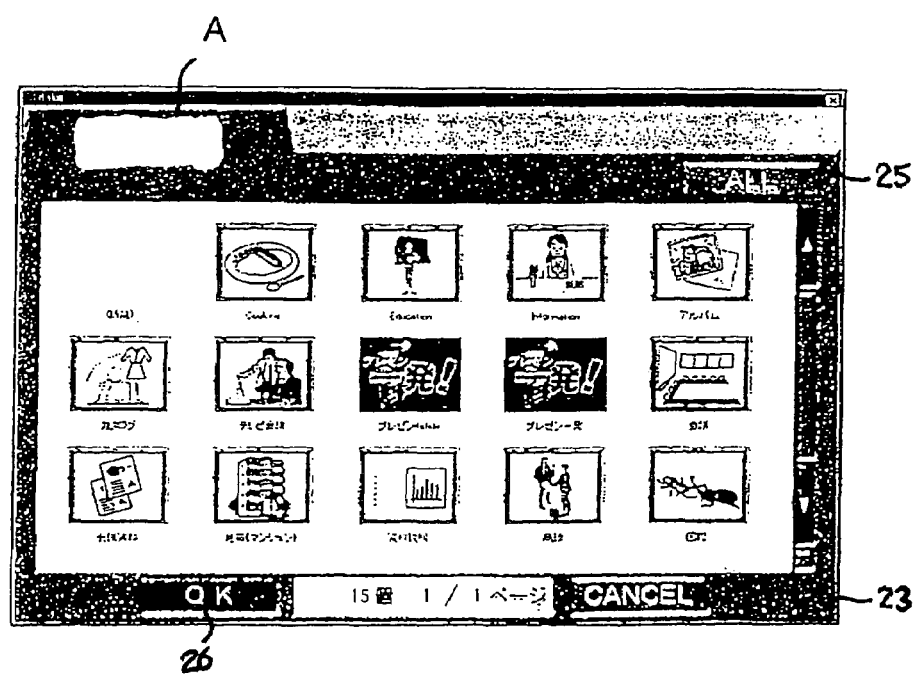
Fig. 15

Fig. 16
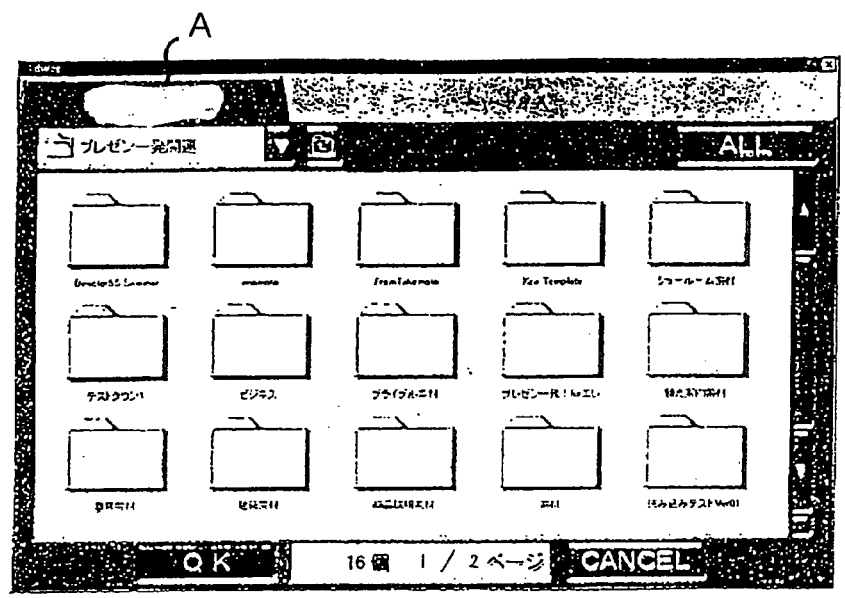
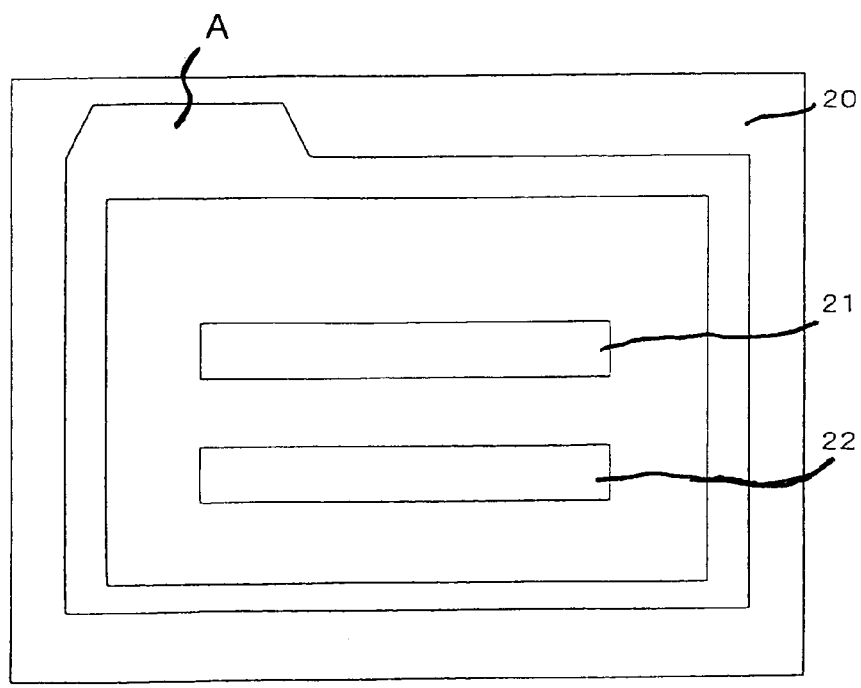
Fig. 17

Fig. 18
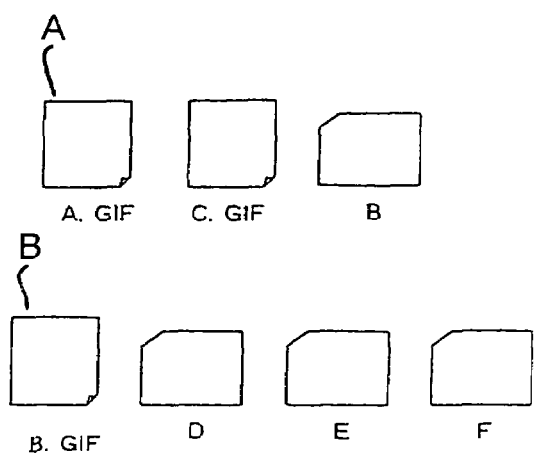
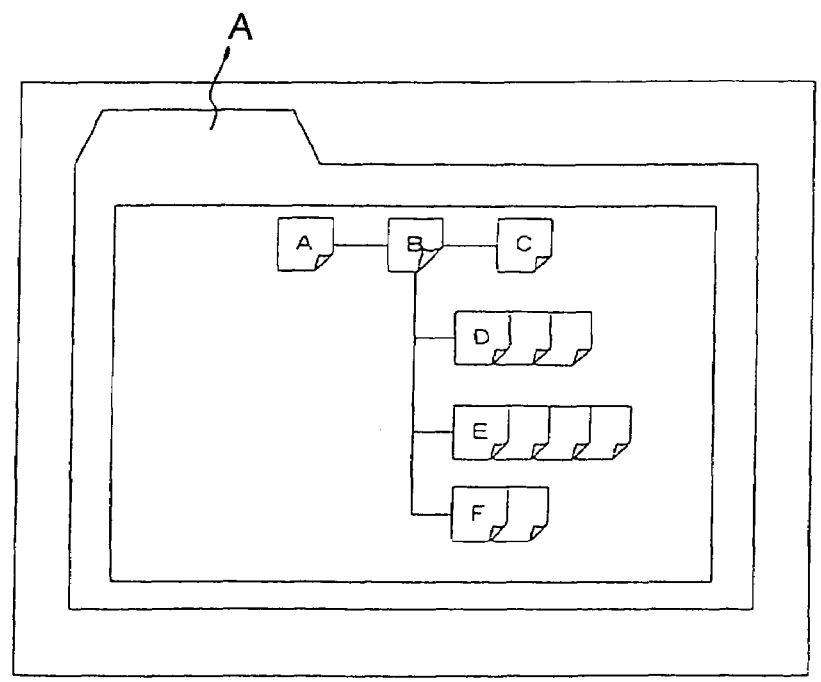
Fig. 19

IMAGE INFORMATION PRESENTATION SYSTEM, IMAGE INFORMATION PRESENTATION METHOD, MEDIUM STORING IMAGE INFORMATION PRESENTATION SYSTEM PROGRAM, AND SIGNAL THEREFOR

BACKGROUND OF THE INVENTION

This invention relates to an image presentation system for presenting image information of a still image input from an image input unit such as a scanner or a camera, a moving image prepared in a computer, and the like.

In a related art, for example, the Unexamined Japanese Patent Application No. Hei 5-290143 describes an image information presentation system that can easily execute a page move without any error at the presentation execution time.

More particularly, the image information presentation system comprises information storage means for storing image information comprising full-size images of image size displayed at the presentation execution time and listed images reduced to the image size displayed at the image retrieval time and scenario information describing image names displayed at the presentation execution time and the display order, image display means for displaying the image information, a central control unit for displaying the image information in order according to the scenario information, and image retrieval means for starting a function for listing the listed images at any point in time while the image information is being presented and continuing the scenario starting at any desired listed image when the listed image is selected from among the listed images.

However, not only still images, but also moving images are used as image information used for presentation. In the above-described related art, reduced and listed images, which will be hereinafter referred to as thumbnails, are all displayed as still images. That is, as image information of a moving image, the still image representing the moving image and other still images are displayed side by side and when the still image representing the moving image is selected, the screen is changed to a full-size screen and the moving image is displayed.

Therefore, whether an image is a moving or still image cannot be determined at a glance and the operation of checking whether or not each image is a moving image is required. Since the moving image cannot directly be viewed, it cannot be compared with image information of other still images, etc., on display for selection and selection work consumes time.

In another related art, for example, the Unexamined Japanese Patent Application Publication No. Hei 8-180037 describes a document preparation support system for even the user who is unfamiliar with presentation or document preparation to prepare a high-quality document smoothly.

More particularly, in parallel with placement of parts such as titles, shape change, and text pattern change processing executed by the user, the document preparation support system uses the visual comfort degree of the layout concerning the parts, the shapes, and the text pattern, namely, a predetermined evaluation criterion for the layout of the parts in the prepared document and the like and calculates an evaluation value quantitatively representing the difference from the ideal state defined on the evaluation criterion or the same degree as the ideal state, then informs the user of the evaluation value by an image or voice.

The user can use the provided evaluation result as one guideline to evaluate the beauty and visibility of the balance, etc., of placement, shapes, and sizes of the text, graphs, patterns, etc., of the prepared document.

Even the user who is unfamiliar with presentation or document preparation can place the title, text, graphs, photos, etc., in balance and prepare a high-quality document smoothly.

However, to prepare the presentation document, particularly to read images, work of specifying one image at a time and reading it becomes necessary. As the images to be read increase, time and effort are spent on the work and it takes time in editing; it is very inconvenient.

Since pages are related to each other in a hierarchical structure, in an edit mode capable of displaying only one page at a time, the operator specifies the next image one page at a time and executes editing while imaging the whole concatenation of the pages in his or her head, thus a lot of time and labor is spent on the edit work.

SUMMARY OF THE INVENTION

It is therefore a first object of the invention to solve the problems.

According to aspect 1 of the invention, there is provided an image information presentation system comprising:

material storage means for storing image information including a still image and a moving image, display means for displaying the image information, display control means for displaying image information in a predetermined size on the display means, and listing control means for reducing the image information stored in the material storage means and displaying a plurality of images in a list format on the display means, the listing control means including:
  a determination section for determining whether the reduced information is a still or moving image,
  a still image reduction section, if the determination section determines that the image information is a still image, for performing processing for producing reduced display of the image,
  a moving image reduction section, if the determination section determines that the image information is a moving image, for performing processing for producing reduced display of the image and driving the moving image in this state, and
  a listing section for listing the image information provided by the still image reduction section and the moving image reduction section on the display means.

According to aspect 2 of the invention, there is provided an image information presentation method in an image information presentation system comprising: providing material storage means for storing image information including a still image and a moving image, providing display means for displaying the image information, providing display control means for displaying image information in a predetermined size on the display means, the image information presentation method comprising:

the first step of reading the image information from the material storage means, the second step of determining whether the read information is a still or moving image, the third step of performing processing for producing reduced display of the image, if it is determined at the second step that the image information is a still image, the fourth step of performing processing for producing reduced display of the image, if it is determined at the second step that the image information is a moving image, the fifth step of driving the moving image in the reduced display processing state at the fourth step, and the sixth step of listing the image information provided at the third and fourth steps on the display means.

According to aspect 3 of the invention, there is provided a computer data signal in a carrier wave for executing an image information presentation system comprising material storage means for storing image information including a still image and a moving image, display means for displaying the image information, and display control means for displaying image information in a predetermined size on the display means to perform:

the computer data signal being for executing the steps comprising:

the first step of reading the image information from the material storage means, the second step of determining whether the read information is a still or moving image, the third step of performing processing for producing reduced display of the image, if it is determined at the second step that the image information is a still image, the fourth step of performing processing for producing reduced display of the image, if it is determined at the second step that the image information is a moving image, the fifth step of driving the moving image in the reduced display processing state at the fourth step, and the sixth step of listing the image information provided at the third and fourth steps on the display means.

According to aspect 4 of the invention, there is provided a medium storing an image information presentation system program for reading image information including a still image and a moving image, stored in material storage means and listing the read image information, the program being for executing the steps comprising:

the first step of reading the image information from the material storage means, the second step of determining whether the read information is a still or moving image, the third step of performing processing for producing reduced display of the image, if it is determined at the second step that the image information is a still image, the fourth step of performing processing for producing reduced display of the image, if it is determined at the second step that the image information is a moving image, the fifth step of driving the moving image in the reduced display processing state at the fourth step, and the sixth step of listing the image information provided at the third and fourth steps on the display means.

Further, it is therefore a second object of the invention to solve the problems.

According to aspect 5 of the invention, there is provided an image information presentation system comprising:

material storage means for storing image information of a still image and a moving image, material listing means for listing the image information in the material storage means on display means, image specification means for enabling specification of more than one piece of the image information listed on the display means, and presentation preparation means for reading all images specified with the image specification means in batch into templates having related pages of a template as one page into which images are inserted for preparing an image information presentation document.

According to aspect 6 of the invention, there is provided the image information presentation system as in aspect 5, wherein the presentation preparation means reads the specified images with the image specification means in order starting at the specified page of the template.

According to aspect 7 of the invention, there is provided the image information presentation system as in aspect 5 or 6, further comprising:

presentation storage means for storing the image information presentation document prepared in the presentation preparation means, and presentation listing means for listing the image information presentation documents stored in the presentation storage means.

According to aspect 8 of the invention, there is provided the image information presentation system as in any one of aspects 5 to 7, wherein the material storage means also stores a folder of a set of the image information placed in a hierarchical structure, and when images are read and an image information presentation document is prepared with the folder specified, the presentation preparation means makes the hierarchical structure of the templates the same as that of the folder and prepares the image information presentation document.

According to aspect 9 of the invention, there is provided the image information presentation system as in aspect 8, further comprising:

presentation hierarchy display means for listing the pages of the image information presentation document in a hierarchical structure and displaying the pages at the same level in overlapping relation.

According to aspect 10 of the invention, there is provided the image information presentation system as in aspect 9, further comprising:

edit means for performing editing including exchanging and replacing the image information read into the pages in the hierarchy display state of the presentation hierarchy display means.

According to aspect 11 of the invention, there is provided the image information presentation system as in any one of aspects 5 to 10, further comprising:

name read means for automatically reading titles of the pages of the templates, wherein the material storage means stores image information with a file name, and the name read means reads the file name of the image information as the title of the page of the template into which the image information is read.

According to aspect 12 of the invention, there is provided an image information presentation method comprising:

the first step of listing from material storage means for storing image information including a still image and a moving image, the image information on display means, the second step of specifying more than one piece of the image information listed at the first step with image specification means, and the third step of reading all image information specified at the second step in batch into templates having related pages of a template as one page into which images are inserted and preparing an image information presentation document by presentation preparation means.

According to aspect 13 of the invention, there is provided the image information presentation method as in aspect 12, further comprising:

the fourth step, when the image information pieces specified at the second step are a folder of a set of image information in a hierarchical structure, of making the hierarchical structure of the templates the same as that of the folder, reading the image information, and preparing the image information presentation document by the presentation preparation means.

According to aspect 14 of the invention, there is provided a computer data signal embodied in a carrier wave for executing an image information presentation system, the computer data signal being for executing the steps comprising:

the first step of listing from material storage means for storing image information including a still image and a moving image, the image information on display means, the second step of specifying more than one piece of the image information listed at the first step with image specification means, and the third step of reading all image information specified at the second step in batch into templates having related pages of a template as one page into which images are inserted and preparing an image information presentation document by presentation preparation means.

According to aspect 15 of the invention, there is provided a medium storing an image information presentation system program for executing:

the first step of listing from material storage means for storing image information including a still image and a moving image, the image information on display means, the second step of specifying more than one piece of the image information listed at the first step with image specification means, and the third step of reading all image information specified at the second step in batch into templates having related pages of a template as one page into which images are inserted and preparing an image information presentation document by presentation preparation means.

According to aspect 16 of the invention, there is provided the medium storing the image information presentation system program as in aspect 15, wherein the program further comprising:

the fourth step, when the image information pieces specified at the second step are a folder of a set of image information in a hierarchical structure, of making the hierarchical structure of the templates the same as that of the folder, reading the image information, and preparing the image information presentation document by the presentation preparation means.

BRIEF DESCRIPTION OF THE DRAWINGS

In the accompanying drawings:

FIG. 8 is a drawing to show an example of image information comprising a still image inserted into a template on a screen displayed on the display means;

FIG. 9 is a drawing to show a listing screen of screens displayed on the display means;

FIG. 14 is a drawing to show an initial screen of screens displayed on display means;

FIG. 15 is a drawing to show a listing screen of screens displayed on the display means;

FIG. 16 is a drawing to show a folder listing screen of screens displayed on the display means;

FIG. 17 is a drawing to show an edit selection screen of screens displayed on the display means;

FIG. 18 is a drawing to show an example of image information stored in a hierarchical structure in folder;

FIG. 19 is a drawing to show a listing screen of the hierarchical structure in FIG. 18.

DETAILED DESCRIPTION OF THE PREFERRED EMBODIMENTS

Referring now to the accompanying drawings, there is shown a preferred embodiment of the invention.

The term "template" used throughout the specification refers to one-page image display produced on the full screen of display means 102 when presentation is executed, namely, a decorative frame wherein a parts image of a next display or back display button, etc., is placed and image information in material memory 101 is read into a predetermined location. However, a frame into which an image is not read may be called a template.

Presentation document refers to a set of templates related to each other in a hierarchical structure.

Figure 1:
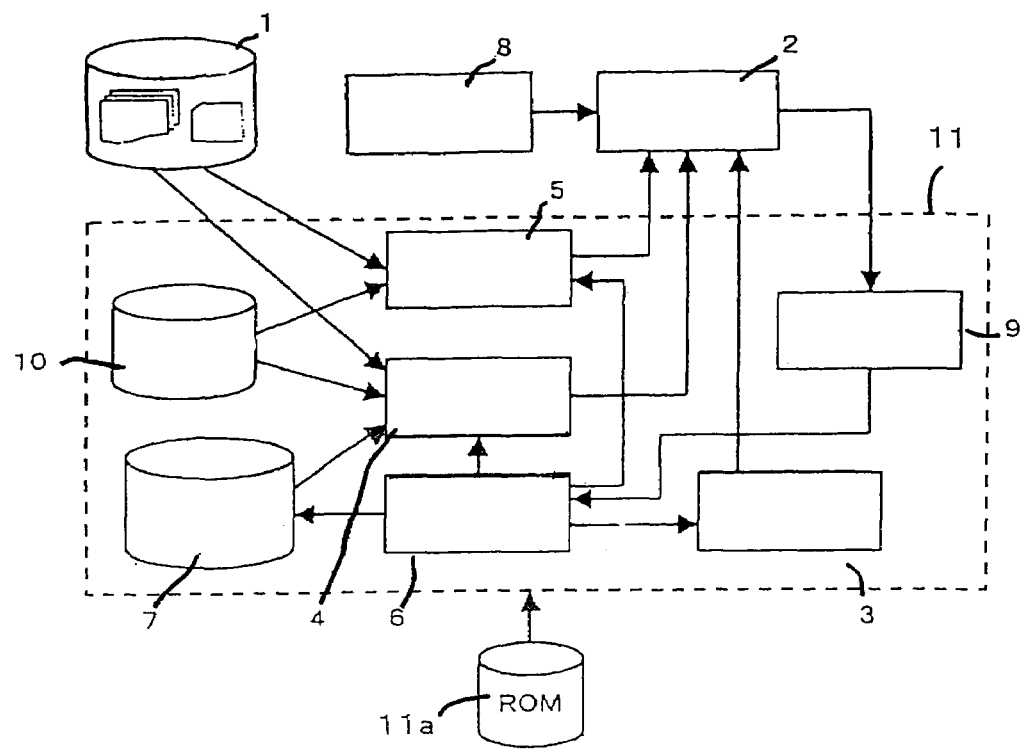
FIG. 1 is a block diagram of an image information presentation system of the invention.

In FIG. 1, numeral 101 denotes material memory as material storage means for storing image information of a still image 101a and a moving image 101b as presentation material, numeral 102 denotes display means such as a CRT, and numeral 103 denotes initial screen display means for outputting initial screen information to the display means 102 for displaying an initial screen.

Figure 7:
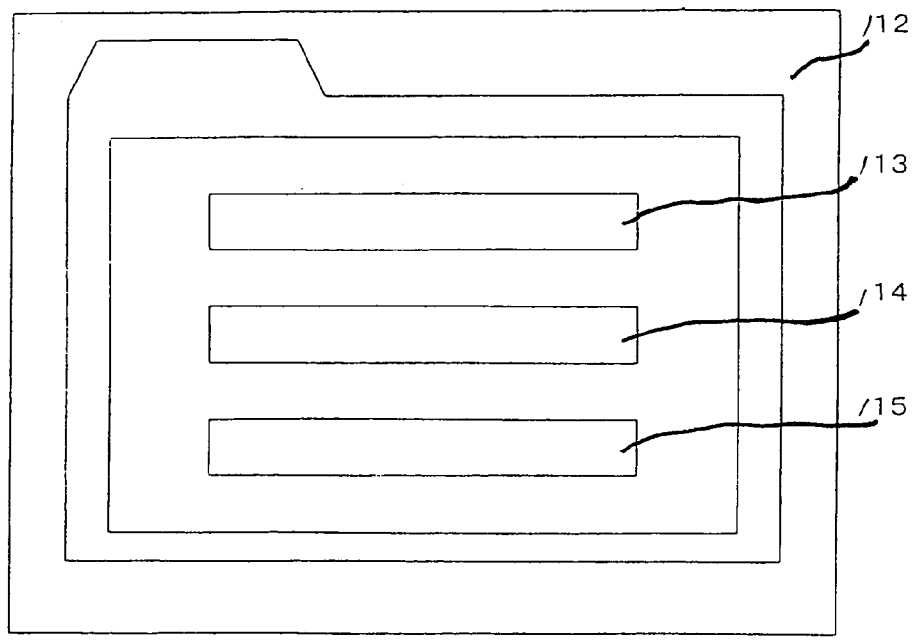
FIG. 7 is a drawing to show an initial screen of screens displayed on display means.

The initial screen display means 103 displays an initial screen 112 as shown in FIG. 7 on the display means 102. Placed on the initial screen 112 are a presentation button 113 for advancing to a mode for starting presentation display, a material listing button 114 for advancing to a mode for listing all image information stored in the material memory 101, and a display quit button 115 for terminating the display operation. When position detection means 109 described later detects the surrounding area of the button 113, 114, or 115 being specified with position specification means 108 described later, the function corresponding to the button 113, 114, or 115 is executed. Hereinafter, the operation will be referred to simply as "specify (specified) with the position specification means 108."

Numeral 104 denotes presentation display control means as folder display means for reading specified image information from the material memory 101 and displaying the read image information on the display means 102 in the specified order and the specified screen size. Numeral 105 denotes listing control means for reducing image information in the material memory 101 and listing the reduced image information on the display means 102.

Figure 2:
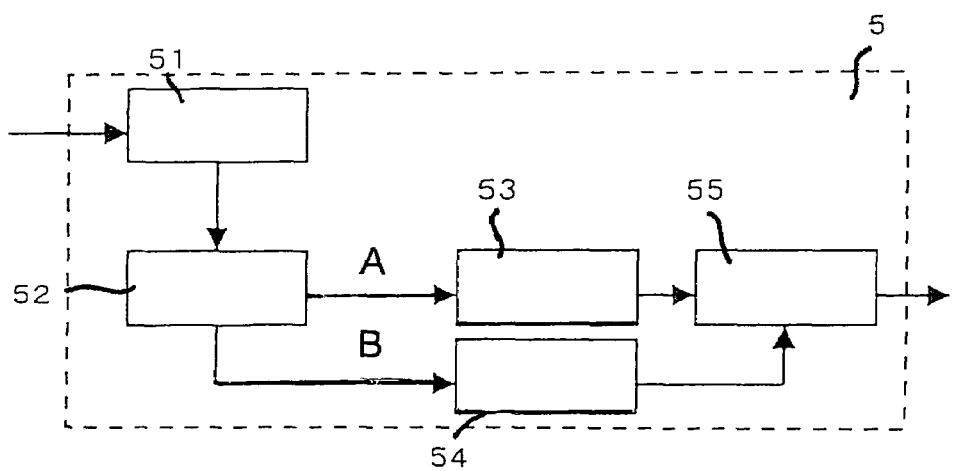
FIG. 2 is a detailed control block diagram of listing control means in FIG. 1.
Figure 3:
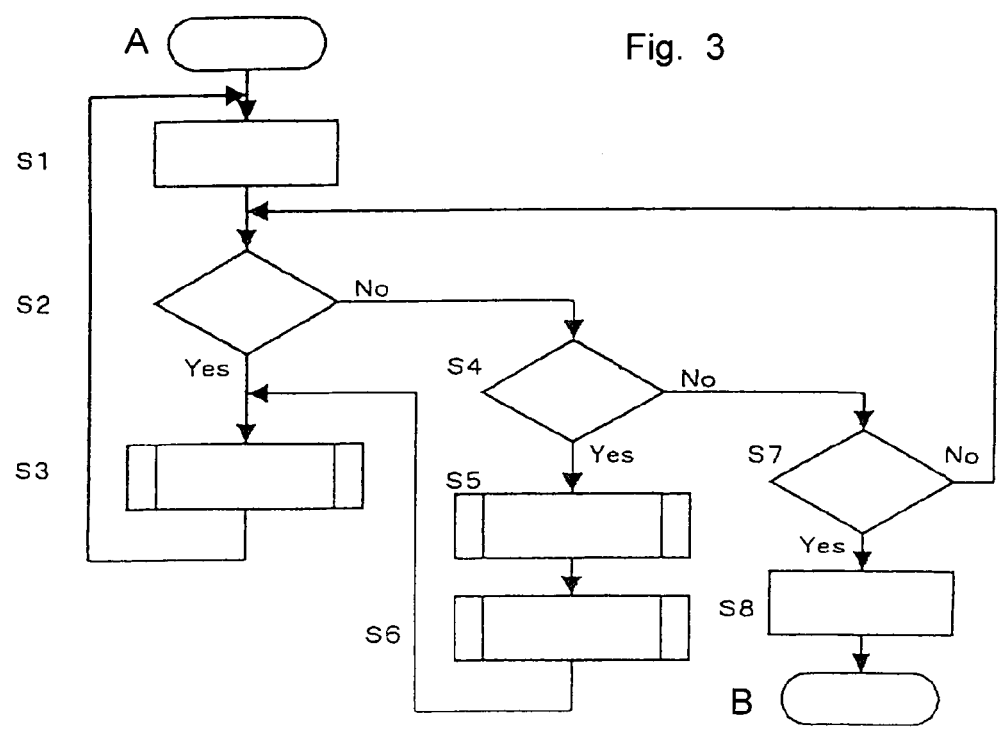
FIG. 3 is a flowchart to show the operation of the image information presentation system of the invention.

The listing control means 105 has a read section 151 for reading image information from the material memory 101, a determination section 152 for determining whether the image information read in the read section 151 is a still or moving image, a still image reduction section 153 for reducing a still image 101*a* in the material memory 101, a moving image reduction section 154 for reducing a moving image 101*b* in the material memory 101 and driving and repeatedly reproducing the moving image, and a listing section 155 for listing the image information reduced in the still image reduction section 153 and the moving image reduction section 154 on the display means 102, as shown in FIG. 2.

In the operation of the listing control means 105, first the read section 151 reads image information from the material memory 101. Next, the determination section 152 determines whether the read image information is a still or moving image. If the determination section 152 determines that the image information is a still image, it sends the image information to the still image reduction section 153 for reducing the image information so that the image information can be listed. If the determination section 152 determines that the image information is a moving image, it sends the image information to the moving image reduction section 154 for reducing the image information so that the image information can be listed and driving the moving image. The image information reduced in the still image reduction section 153 and the moving image reduction section 154 is sent to the listing section 155, which then places the image information so that the image information can be listed on the display means 102, and sends the image information to the display means 102.

Numeral 106 denotes display control means as edit means for driving and controlling the initial screen display means 103, the presentation display control means 104, and the listing control means 105, numeral 107 denotes scenario memory as scenario storage means for storing image information specified and read in the presentation display control means 104 and the image information display order, numeral 108 denotes position specification means for specifying any position on the display screen of the display means 102, numeral 109 denotes position detection means for detecting the position specified in the position specification means 108, and numeral 110 denotes parts memory for storing parts image information of presentation template buttons, decorative frames, etc., described later.

Numeral 111 denotes control means which comprises the initial screen display means 103, the presentation display control means 104, the listing control means 105, the display control means 106, the scenario memory 107, the position detection means 109, and the parts memory 110. Programs for executing the functions of the initial screen display means 103 and the position detection means 109 of the control means 111 are stored in ROM 111*a*.

The operation of the described image information presentation system will be discussed with reference to FIGS. 3 to 6.

First, at step S301, the display control means 106 drives the initial screen display means 103 for displaying the initial screen 112 in FIG. 7 on the display means 102. At step S302, whether or not the presentation button 113 is specified with the position specification means 108 is determined.

If it is determined at step S302 that the presentation button 113 is specified, at step S303 the display control means 106 drives the presentation display control means 104 for producing presentation display on the display means 102.

If it is not determined at step S302 that the presentation button 113 is specified, at step S304 whether or not the listing button 114 is specified is determined.

Figure 4:
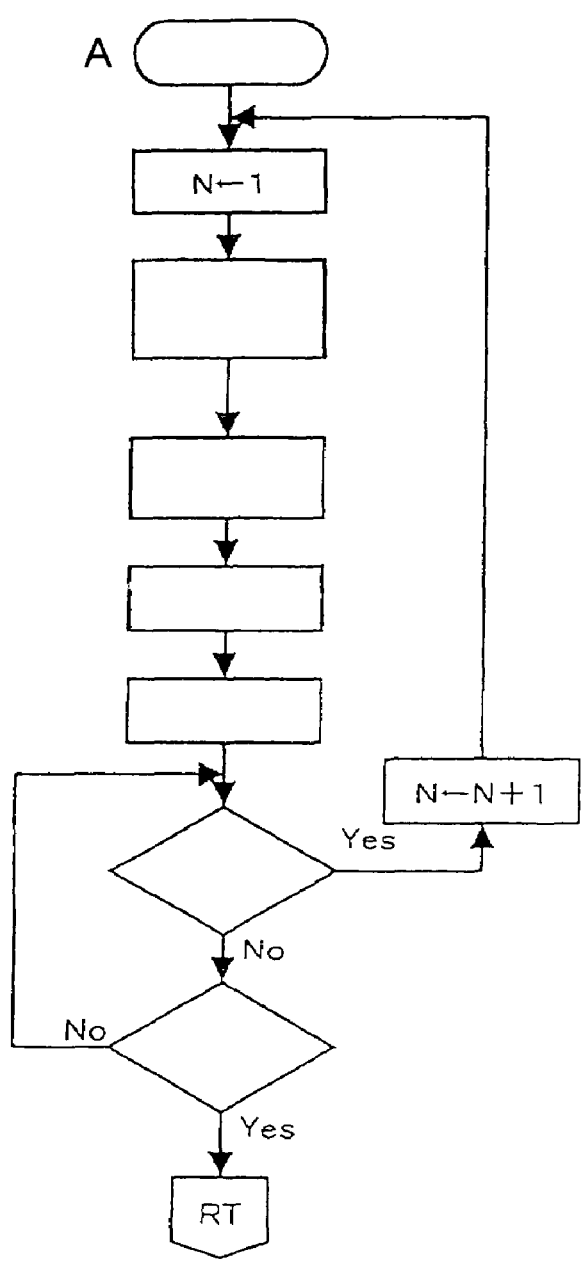
FIG. 4 is an operation flowchart concerning presentation display in FIG. 3.

The presentation display will be discussed specifically below based on FIG. 4.

First, at step S420, the display control means 106 sets a register (not shown) in the presentation display control means 104 to 1 as a variable N. The display control means 106 drives the presentation display control means 104. At step S421, the presentation display control means 104 reads the address in the material memory 101 at which the n'th (in this case, first) image information is stored from the scenario memory 107. At step S422, the presentation display control means 104 reads the image information from the material memory 101 based on the address read at step S421.

At step S423, the image information read at step S422 is inserted into an image insertion area in a predetermined template. At step S424, the template and the image information are output to the display means 102 for displaying them on the display means 102. At this time, if the image information is a moving image, the moving image is driven on the display means 102. FIG. 8 shows an example of an image comprising a still image inserted into a template.

At step S425, whether or not a NEXT button for advancing to the next display is specified with the position specification means 108 is determined. If it is determined that the button is specified, control goes to step S426 and the variable N is incremented by one, then control returns to step S421 and steps S421 to S426 are repeated until the end of the display order stored in the scenario memory 107 is reached.

When the last screen is reached and a presentation quit button placed in the template is specified with the position specification means 108, it is not determined at step S425 that the NEXT button is specified (NO at step S425), and control goes to step S427 at which it is determined that the presentation quit button is specified. Then, the presentation display is terminated and control returns to step S303 and goes to step S301 for changing to the initial screen display. The operation at step S303 is now complete.

If it is determined at step S304 that the listing button 114 for preparing a presentation document is specified, at step S305 the display control means 106 drives and controls the listing control means 105 for listing all image information in the material memory 101 on the display means 102.

Figure 5:
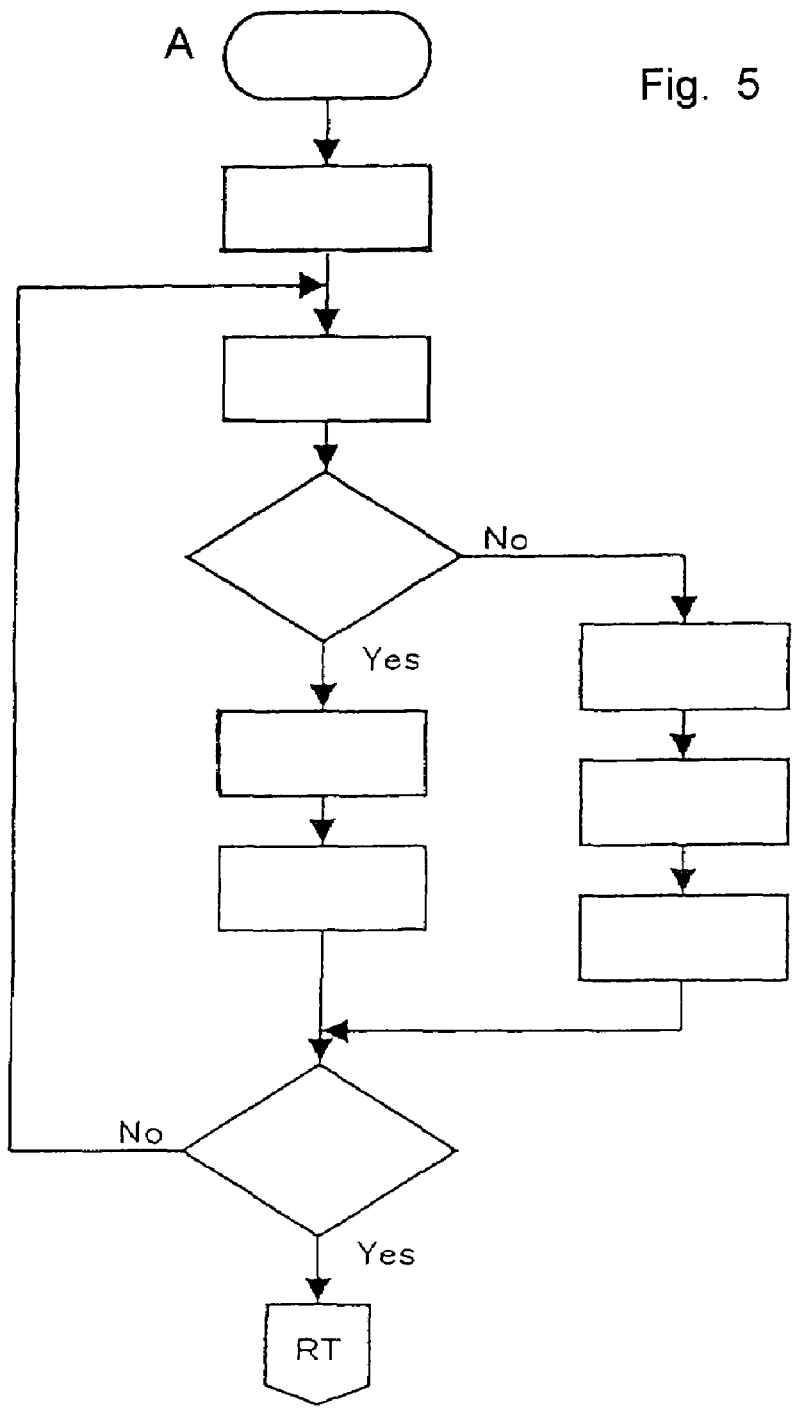
FIG. 5 is an operation flowchart concerning listing in FIG. 3.

The listing will be discussed specifically below based on FIG. 5.

First, at step, S530, a template for a presentation document to be prepared is prepared and is stored in the scenario memory 107 as a preference file.

That is, the display control means 106 operates the listing control means 105 for listing parts images stored in the parts memory 110, for example, buttons, decorative frames, etc., having different shapes and colors on the display means 102. Seeing the listed parts images, the operator selects the parts images of desired decorative frames, buttons, etc., with the position specification means 108 and combines them in a desired form for preparing a template.

The prepared template is not stored in the scenario memory 107 and the display control means 106 stores only a kind of program description of address information, etc., in the scenario memory 107. For example, the screen of the display means 102 is represented by two-dimensional coordinates and the coordinates of the position where a button or a decorative frame is placed, the address in the parts memory 110 at which the parts image placed at the position is stored, and the display size of the image are stored in the scenario memory 107 as one preference file for each presentation document.

Next, at step S531, the display control means 106 instructs the listing control means 105 to perform the listing operation and drives the listing control means 105. The read section 151 in the listing control means 105 reads one piece of the image information stored in the material memory 101. At step S532, the determination section 152 determines whether or not the read image information is a still image. If it is determined at step S532 that the image information is a still image, control goes to step S533 at which the still image reduction section 153 processes the image information so that the image information can be reduced on display.

At step S534, the listing section 155 lists the thumbnail (reduced image information) processed at step S533, on the display means 102. FIG. 9 shows an example of the listing. At step S535, whether or not all image information in the material memory 101 is read by the read section 151 is determined. If not all image information is read, control returns to step S531 and the operation is again executed starting at step S531.

If it is determined at step S532 that the image information read from the material memory 101 is a moving image rather than a still image, control goes to step S536 at which the moving image reduction section 154 processes the image information so that the moving image can be reduced on display for listing. At step S537, the listing section 155 displays the thumbnail processed at step S536 on the display means 102. At step S538, the moving image reduction section 154 drives the thumbnail displayed on the display means 102.

Steps S531 to S538 are repeated until it is determined at step S535 that all image information in the material memory 101 has been read. When it is determined at step S535 that all image information in the material memory 101 has been read, the operation at step S305 is complete.

After completion of the operation at step S305, control goes to step S306 and seeing the listing on the display means 102, the operator selects image information used for presentation, specifies the image information display order, and edits.

The listing edit will be discussed specifically below based on FIG. 6.

First, at step S640, images to be inserted are put into a presentation template.

Herein, the operator specifies the images to be used for presentation among the thumbnails listed on the display means 102 with the position specification means 108. At this time, the operator also specifies the order of the images used for presentation. The thumbnail specification order may be adopted as the presentation order.

At step S641, whether or not the edit operation is complete is determined. If the edit operation is not complete, step S640 is repeated. If it is determined at step S641 that the edit operation is complete, control goes to step S643 and the address in the material memory 101 at which the specified thumbnail is stored and the order are added to the template information stored in the preference file in the scenario memory 107. The position on the template where the image of the specified thumbnail is put is specified by the selected decorative frame and thus need not be specified at the time.

The listing edit operation at step S306 is now complete. Then, control goes to step S303 and presentation display is produced for the operator to check the result.

If it is not determined at step S304 that the listing button 114 is specified (NO at step S304), it is judged whether or not the display quit button 115 is specified with the position specification means 108 is determined.

If it is determined at step S307 that the display quit button 115 is specified, control goes to step S308 at which the operation of the display control means 106 is terminated and the display operation is terminated.

If it is not determined at step S307 that the display quit button 115 is specified (NO at step S307), namely, if invalid specification operation is performed, control returns to step S302 and a wait is made for the next operation.

In the embodiment, still and moving images are applied as the image information stored in the material memory 101, but the scope of the invention is not limited to them. Three-dimensional data prepared in the QuickTime VR format or the VRML format may also be stored and the listing means 105 may reduce and display a panorama image, etc., on the display means 102.

A preference file describing read image information, image information size, read position, and the like forming display for each presentation document is created and stored in the scenario memory 107, but the scope of the invention is not limited to them. A template into which an image is read may be prepared as one image file of bitmap, GIF file, etc., and be stored in the scenario memory 107.

If a folder is specified in place of image information specified at step S306, when the image in the folder specified at step S643 is read into a template, more preferably the hierarchical structure of templates is made the same as that of folder. If the hierarchical structure is determined for storage at the folder preparation time, a lot of time and labor for later presentation document preparation can be saved.

When the hierarchical structure is specified and a presentation document is prepared, more preferably, the number of buttons specified when a transition is made to another level is automatically determined matching the number of branches in the hierarchical structure and the buttons are placed in each template as a branch screen of the hierarchical structure. At this time, the folder name put on the branch destination folder is input to the placed button and is displayed on the button. Further, the branch destination address is also input to the button; automatically the button is prepared as a hierarchical link button.

That is, placement of buttons and jump addresses applied when the buttons are specified are set simply by specifying a folder and inputting the folder as a presentation document. Thus, the operator is relieved of burdensome button design placement and link setting.

In the embodiment, the template is prepared by reconfiguring the image information in the material memory 101 and the parts image information in the template memory 102, but the scope of the invention is not limited to it. Any image information may be reduced or enlarged and more than one image information piece may be combined into a template.

Further, in the embodiment, the image information presentation document is described as presentation document preparation, but the scope of the invention is not limited to it. The image information presentation document can also be used for preparing and editing an album, an illustrated reference book, etc.

According to the invention, if still and moving images are mixed, easy editing is enabled based on a listing.

Further, referring now to the accompanying drawings, there is shown a preferred embodiment of the invention.

Figure 10:
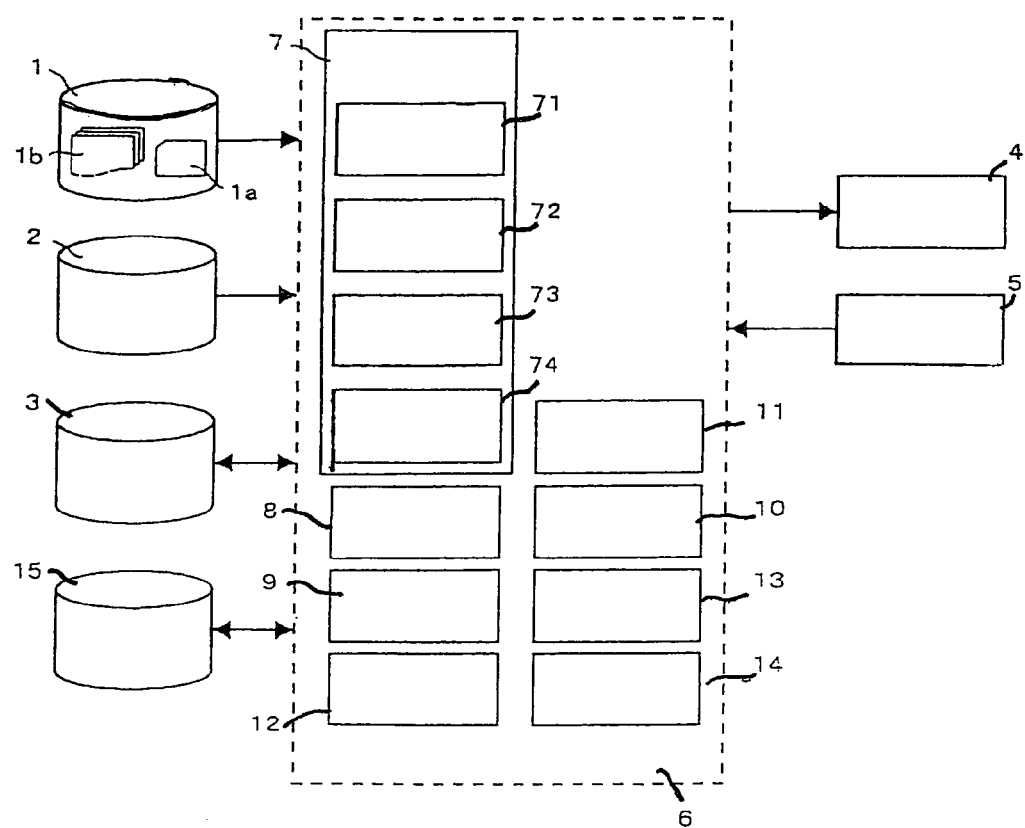
FIG. 10 is a block diagram of an image information presentation system of the invention.

In FIG. 10, numeral 1 denotes material memory as material storage means for storing image information of a still image 1a and a moving image 1b as presentation material, numeral 2 denotes template memory for storing parts image information comprising decorative frames having different shapes and colors to insert the image information in the material memory 1, buttons, background, etc., and a set of decorative frames of pages related in a hierarchical structure with one decorative frame as one page, which will be hereinafter referred to as template.

Numeral 3 denotes presentation memory as presentation storage means for storing a presentation document as an image information presentation document prepared as a folder comprising the templates in the template memory 2 into which images are inserted, related and concatenated hierarchically. Numeral 4 denotes display means such as a CRT and numeral 5 denotes position specification means as image specification means for specifying any position on the display screen of the display means 2.

Numeral 6 denotes control means for controlling image information presentation system of the invention and numeral 7 denotes display control means for controlling display of information stored in the material memory 1, the template memory 2, and the presentation memory 3.

The display control means 7 has a material listing section 71 for listing the image information in the material memory 1 on the display means 4, a template listing section 72 for listing the templates and parts image information in the template memory 2 on the display means 4, a presentation listing section 73 for listing the presentation documents in the presentation memory 3 on the display means 4, and a presentation hierarchy display section 74 for listing the relation state of the image information in one presentation document specified in the presentation memory 3, namely, the hierarchical structure of the image information.

Figure 6:
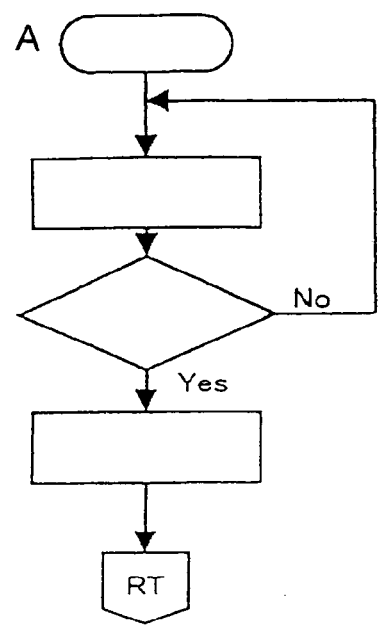
FIG. 6 is an operation flowchart concerning listing edit in FIG. 3.

The material listing section 71 reduces and lists all image information regardless of still or moving images on the display means as shown in FIG. 6, and drives and displays moving images of the listed image information in the reduced state.

The presentation listing section 73 lists the presentation documents on the display means 4 in a folder display format as shown in FIG. 16. The first pages of the presentation documents may be reduced and listed as representative images instead of display in the folder format.

Further, in the presentation hierarchy display section 74, for example, as a presentation document, two images files A and C and a folder B are related at the first level and an image file B as the folder B and folders D, E, an F are related in the folder B at the second level, as shown in FIG. 18. A number of image files are placed in each of the folders D, E, and F.

The hierarchical structure is listed hierarchically as shown in FIG. 19. At this time, if the image files in the folders D, E, and F are all displayed side by side, long display results, thus the image files are displayed in overlapping relation so that all image files can be displayed.

Numeral 8 denotes initial screen display means for displaying an initial screen on the display means 4. The initial screen displayed in the initial screen display means 8 is an initial screen 16, for example, as shown in FIG. 14.

The initial display screen 16 is made up of a decorative frame 23 having a window 24 at the center, namely, a template and three buttons placed in the window 24. The three buttons are a presentation button 17 for starting presentation display, an edit button 18 for preparing a new presentation document or editing any existing presentation document, and an operation quit button 19 for terminating the display operation.

When the surrounding area of the button 17, 18, or 19 is specified with position specification means 8 and specified position detection means 10 described later detects the specification of the button, the function corresponding to the button 17, 18, or 19 is executed. Hereinafter, the operation will be referred to simply as "specify (specified) with the position specification means 5."

Numeral 9 denotes presentation display control means for producing presentation display of each presentation document stored in the presentation memory 3 in a slide show form, numeral 10 denotes specified position detection means for detecting the specified position when a position on the display means 4 is specified, and numeral 11 denotes template specification means for specifying any desired one of the templates stored in the template memory 2.

If a template is not specified, the template specification means 11 assumes that a predetermined template is specified.

Numeral 12 denotes presentation document preparation means for reading image information in the material memory 1 into the template specified with the template specification means 11 for preparing a presentation document, numeral 13 denotes edit means for changing the display order of the image information read through the presentation document preparation means 12 or replacing a part of the read image information with image information in the material memory 1, and numeral 14 denotes name read means for reading a title name of image information.

The name read means 14 reads the name of each image file read by the presentation document preparation means 12 into a template as the title of the image in the presentation document.

Numeral 15 denotes program memory for storing a program for driving the functions of the components in the display control means 6.

The control means 6 contains the functions of the display control means 7 to the name read means 14.

Figure 11:
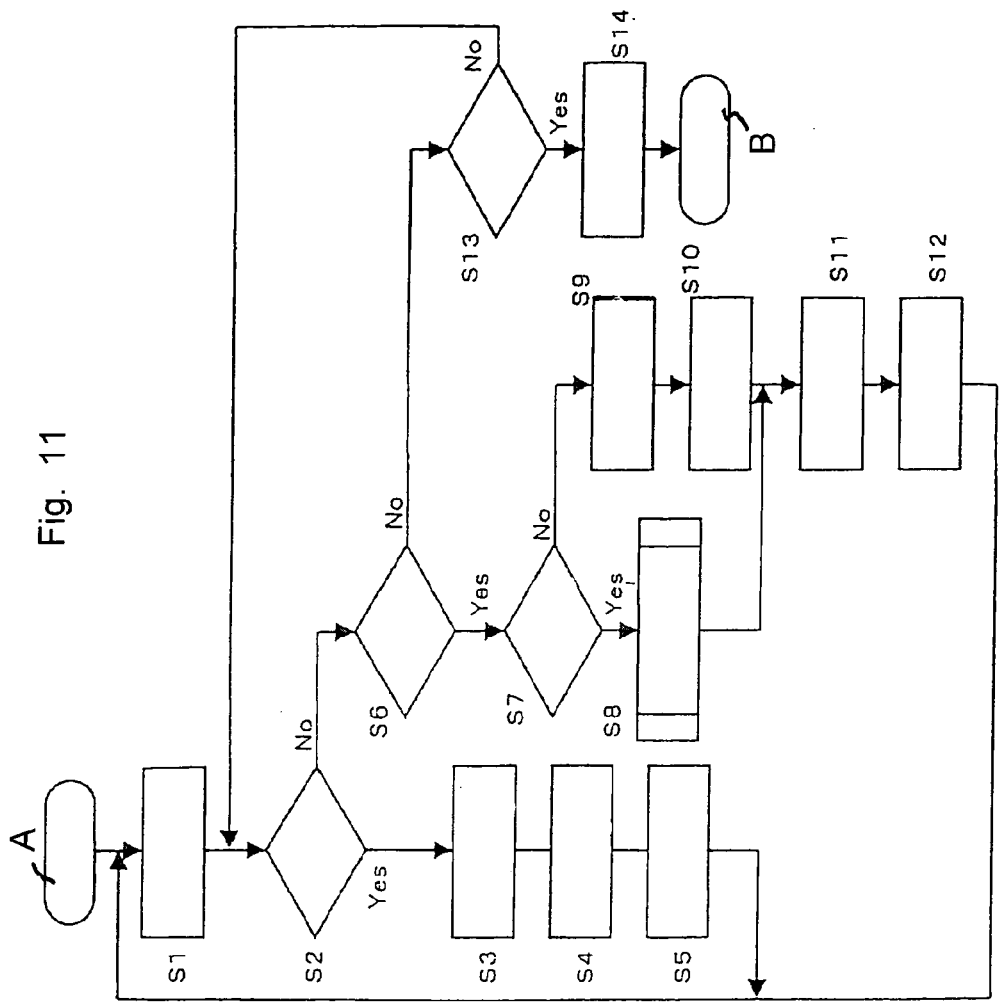
FIG. 11 is a flowchart to show the operation of the image information presentation system of the invention.

The operation of the described image information presentation system will be discussed with reference to FIG. 11.

First, at step S1, the initial screen display means 8 displays the initial screen 16 as shown in FIG. 15 on the display means 4. At step S2, whether or not the presentation button 17 is specified with the position specification means 5 is determined.

If it is determined at step S2 that the presentation button 17 is specified, control goes to step S3 and the presentation listing section 73 lists the presentation documents stored in the presentation memory 3 on the display means 4. At step S4, the presentation document to be displayed is specified with the position specification means 5 among the presentation documents displayed on the display means 4. At step S5, the presentation document specified at step S4 is read from the presentation memory 3 and display for presentation is executed in the slide show form on the display means 4.

Upon completion of execution of the presentation at step S5, control returns to step S1 and the initial screen 16 is again displayed.

If it is not determined at step S2 that the presentation button 17 is specified (NO at step S2), control goes to step S6 and whether or not the edit button 18 is specified is determined.

If it is determined at step S6 that the edit button 18 is specified, control goes to step S7 at which the edit means 13 displays an edit screen 20 as shown in FIG. 17 on the display means 4, and determines whether or not a new preparation button 21 of a presentation document is specified. If it is determined that the new preparation button 21 specified, control goes to step S8 and the new preparation operation is executed.

Figure 12:
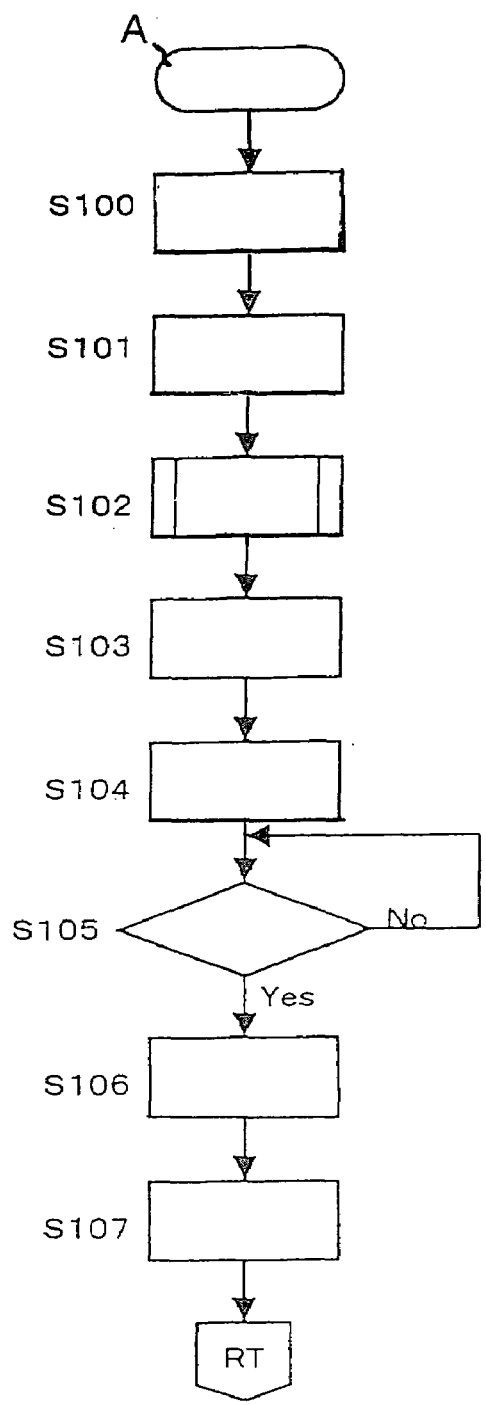
FIG. 12 is an operation flowchart concerning a new preparation step in FIG. 11.

The new preparation operation at step S8 will be discussed with reference to FIG. 12.

First, at step S100, the template listing section 72 lists the parts image information of decorative frames, buttons, etc., stored in the template memory 2 on the display means 4. At step S101, any desired decorative frames, buttons, etc., are specified with the position specification means 5 from the parts image information listed on the display means 4 and templates are prepared and further a presentation document is prepared.

Specifically, all display screens of the prepared templates are not stored in a bit map or GIF format and the presentation preparation means 12 creates a preference file describing addresses in the template memory 2 at which decorative frames used as bases are stored, addresses in the template memory 2 at which buttons placed on the decorative frames are stored, placement positions of the buttons on the decorative frames, addresses in the template memory 2 at which used backgrounds are stored, the number of the templates, and the relation among the templates.

As described above, if no desired template is specified with the position specification means 5, the presentation preparation means 12 automatically creates a preference file corresponding to a preset template.

At step S102, the material listing section 71 lists the image information in the material memory 1 on the display means 4. At step S103, image information used for presentation is selected with the position specification means 5. To select all image information, for example, if an ALL button 25 placed in the upper-right portion of a template 23 in FIG. 15 is specified with the position specification means 5, all image information can be selected.

At step S104, the presentation document prepared at step S101 is hierarchically displayed in the presentation hierarchy display section 74 and the read start page into which image information is to be read is specified.

Figure 20:
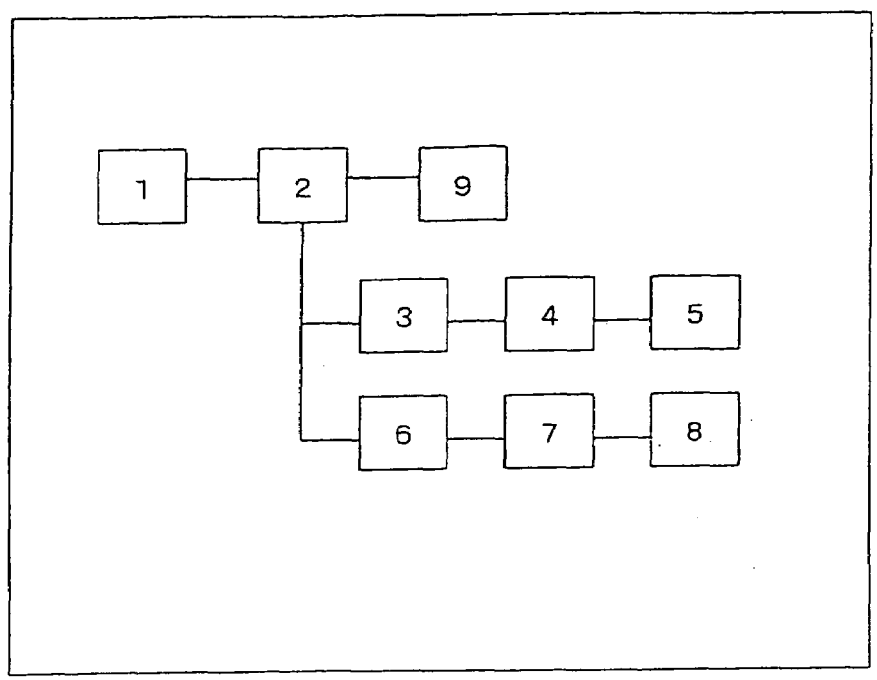
FIG. 20 is a drawing to show an example of a hierarchical structure of presentation documents.

For example, assume that the presentation document prepared at step S101 into which no images are read as shown in FIG. 20 is hierarchically displayed in the presentation hierarchy display section 74. The digits given in FIG. 20 are page numbers of the presentation document. At step S104, the page at which image read is to be started in the hierarchy display may be specified with the position specification means 5.

At step S105, whether or not an OK button 26 placed in the lower-left portion in FIG. 6 for giving a read command, for example, is specified with the position specification means 5 is determined. A wait is made until it is determined that the OK button 26 is specified. When it is determined at step S105 that the OK button 26 is specified, control goes to S106 and the presentation preparation means 12 reads the image information specified at step S103 into the template specified at step S101.

Specifically, if the second page is specified as the insertion start page and four image information pieces are specified in FIG. 20, the address in the material memory 1 at which the image information read into the template of the second page is stored is additionally stored in the template information of the second page in the preference file created at step S101. For the remaining pages (third to fifth pages), the corresponding image information is added to the preference file in a similar manner.

At step S107, the name read means 14 reads the file names of the read image information as the title names of the templates, adds the read names to the preference file, and stores the preference file of the complete presentation document in the presentation memory 3. After this, control returns to step S8 and goes to S11 and the edit operation is executed.

Figure 13:
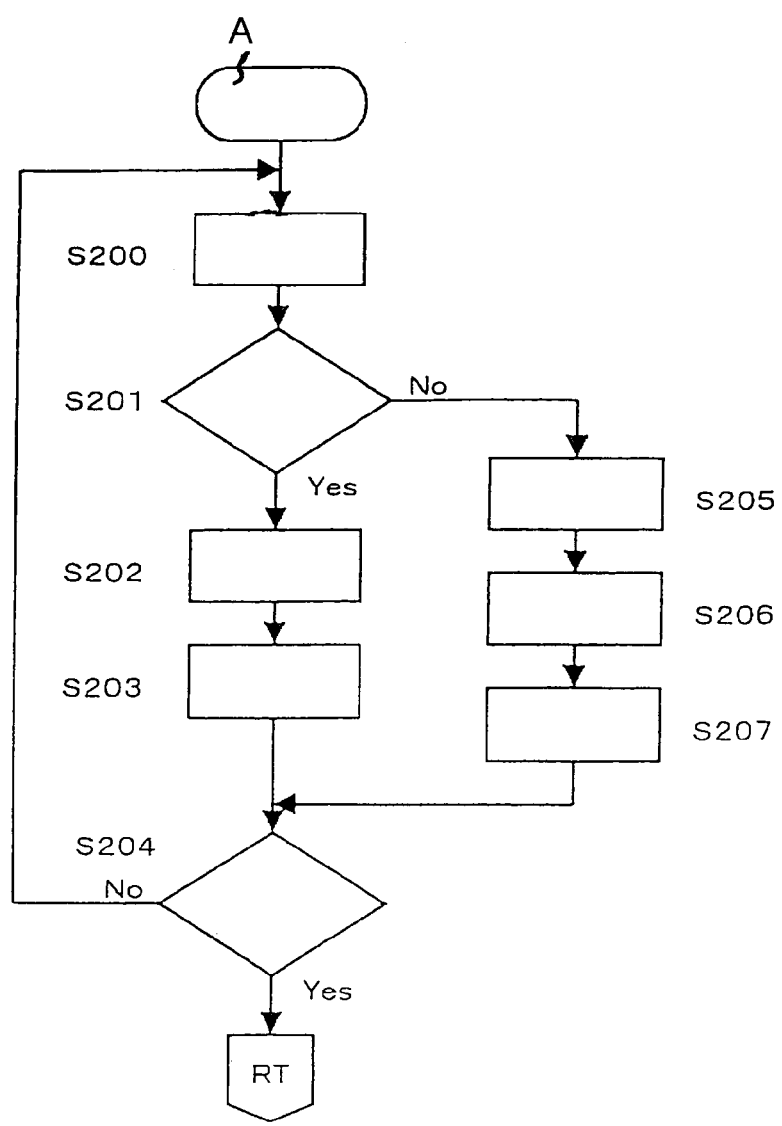
FIG. 13 is an operation flowchart concerning a read step in FIG. 12.

The read operation at step S102 will be discussed in more detail with reference to FIG. 13.

First, at step S200, the control means 1 reads one image information piece from the material memory 1. At step S201, whether or not the read image information is a still image is determined. If it is determined at step S201 that the read image information is a still image, control goes to step S202 and the still image is reduced. At step S203, the material listing section 71 lists on the display means 4, and control goes to step S204.

If it is determined at step S201 that the image information is a moving image rather than a still image, control goes to step S206 at which the moving image is reduced. At step S206, the material listing section 71 lists on the display means 4. At step S207, display of the moving image is driven and control goes to step S204.

At step S204, whether or not all image information has been read from the material memory 1 is determined. If it is determined at step S204 that image information to be read remains, control returns to step S200 and the read operation is again executed. Upon completion of reading all image information, control returns to step S102 and goes to the next step (S103).

The new preparation operation at step S8 is now complete and control goes to the next step (S11).

If it is not determined at step S7 that the new preparation button 21 is specified (NO at step S7), namely, an edit/correct button 22 is specified, control goes to step S9 at which the presentation listing section 73 lists the presentation documents stored in the presentation memory 3 on the display means 4 as shown in FIG. 7. At step S10, any desired one to be edited, of the listed presentation documents is specified with the position specification means 5.

After step S8 or S10 is executed, control goes to step S11 and the pages of the specified presentation document are hierarchically displayed as shown in FIG. 19. The hierarchical structure enables the operator to view the concatenation and order of the pages at a glance.

At step S12, whether or not the display order or the images are proper on the listing at step S11 is determined. If necessary, the image to be edited is specified and the display order is changed or the image is replaced with new image information from the material memory 1. Upon completion of the editing, control returns to step S1 and the initial screen 16 is again displayed on the display means 4.

If it is not determined at step S6 that the edit button 18 is specified (NO at step S6), control goes to step S13 and whether or not the quit button 19 is specified is determined. If it is determined at step S13 that the quit button 19 is specified, control goes to step S14 at which the operation of the control means 6 is terminated and the display operation is terminated.

If it is not determined at step S13 that the quit button 19 is specified (NO at step S13), namely, if invalid specification operation is performed, control returns to step S2 and a wait is made for the next operation.

The images are thus read into the presentation document.

In the embodiment, the material memory may store not only single image information as still and moving images, but also a set (namely, folder) comprising image information related in a hierarchical structure.

If a folder is specified in place of image information specified at step S103, when the presentation preparation means 12 reads the specified image in the folder into the template at step S106, more preferably the hierarchical structure of templates is made the same as that of folder. If the hierarchical structure is determined for storage at the folder preparation time, a lot of time and labor for later presentation document preparation can be saved.

When the hierarchical structure is specified and a presentation document is prepared, more preferably, the number of buttons specified when a transition is made to another level is automatically determined matching the number of branches in the hierarchical structure and the buttons are placed in each template as a branch screen of the hierarchical structure. At this time, the folder name put on the branch destination folder is input to the placed button and is displayed on the button. Further, the branch destination address is also input to the button; automatically the button is prepared as a hierarchical link button.

That is, placement of buttons and jump addresses applied when the buttons are specified are set simply by specifying a folder and inputting the folder as a presentation document. Thus, the operator is relieved of burdensome button design placement and link setting.

In the embodiment, still and moving images are applied as the image information stored in the material memory 1, but the scope of the invention is not limited to them. Three-dimensional data prepared in the QuickTime VR format or the VRML format may also be contained and the material listing section 71 may reduce and display a panorama image, etc., on the display means 4.

In the embodiment, the template is prepared by reconfiguring the image information in the material memory 1 and the parts image information in the template memory 2, but the scope of the invention is not limited to it. Any image information may be reduced or enlarged and more than one image information piece may be combined into a template.

A preference file describing read image information, image information size, read position, and the like forming display for each presentation document is created and stored in the presentation memory 3, but the scope of the invention is not limited to them. A template into which an image is read may be prepared as one image file of bit map, GIF file, etc., and be stored in the presentation memory 3.

In the embodiment, the image information presentation document is described as presentation document preparation, but the scope of the invention is not limited to it. The image information presentation document can also be used for preparing and editing an album, an illustrated reference book, etc.

According to the invention, when a presentation document is prepared, time and labor are saved and easy preparation and editing can be executed. Since the hierarchical structure is displayed, the relation state in the hierarchical structure can be seen at a glance; visibility is improved and ease of edit work can be enhanced.

What is claimed is:

1. An image information presentation system comprising:
    material storage means for storing image information including a still image and a moving image,
    display means for displaying the image information,
    display control means for displaying image information in a predetermined size on said display means, and
    listing control means for reducing the image information stored in said material storage means and displaying a plurality of images in a list format on said display means, said listing control means including:
        a determination section for determining whether the reduced information is a still or moving image,
        a still image reduction section, if said determination section determines that the image information is a still image, for performing processing for producing reduced display of the image,
        a moving image reduction section, if said determination section determines that the image information is a moving image, for performing processing for producing reduced display of the image and driving the moving image in this state, and
        a listing section for listing the image information provided by said still image reduction section and said moving image reduction section on said display means.

2. An image information presentation method in an image information presentation system comprising: providing material storage means for storing image information including a still image and a moving image, providing display means for displaying the image information, providing display control means for displaying image information in a predetermined size on said display means,
    said image information presentation method comprising:
        the first step of reading the image information from said material storage means,
        the second step of determining whether the read information is a still or moving image,
        the third step of performing processing for producing reduced display of the image, if it is determined at said second step that the image information is a still image,
        the fourth step of performing processing for producing reduced display of the image, if it is determined at said second step that the image information is a moving image,
        the fifth step of driving the moving image in the reduced display processing state at said fourth step, and
        the sixth step of listing the image information provided at said third and fourth steps on said display means.

3. A computer data signal in a carrier wave for executing an image information presentation system comprising material storage means for storing image information including a still image and a moving image, display means for displaying the image information, and display control means for displaying image information in a predetermined size on said display means to perform:
    the computer data signal being for executing the steps comprising:
        the first step of reading the image information from said material storage means,
        the second step of determining whether the read information is a still or moving image,
        the third step of performing processing for producing reduced display of the image, if it is determined at said second step that the image information is a still image,
        the fourth step of performing processing for producing reduced display of the image, if it is determined at said second step that the image information is a moving image,
        the fifth step of driving the moving image in the reduced display processing state at said fourth step, and
        the sixth step of listing the image information provided at said third and fourth steps on said display means.

4. A medium storing an image information presentation system program for reading image information including a still image and a moving image, stored in material storage means and listing the read image information,
    the program being for executing the steps comprising:
        the first step of reading the image information from said material storage means,
        the second step of determining whether the read information is a still or moving image,
        the third step of performing processing for producing reduced display of the image, if it is determined at said second step that the image information is a still image,
        the fourth step of performing processing for producing reduced display of the image, if it is determined at said second step that the image information is a moving image, the fifth step of driving the moving image in the reduced display processing state at said fourth step, and the sixth step of listing the image information provided at said third and fourth steps on said display means.

5. An image information presentation system comprising:

material storage means for storing image information of a still image and a moving image, material listing means for listing the image information in said material storage means on display means, image specification means for enabling specification of more than one piece of the image information listed on the display means, and presentation preparation means for reading all images specified with said image specification means in batch into templates having related pages of a template as one page into which images are inserted for preparing an image information presentation document.

6. The image information presentation system as claimed in claim 5, wherein said presentation preparation means reads the specified images with said image specification means in order starting at the specified page of the template.

7. The image information presentation system as claimed in claim 5 or 6, further comprising:

presentation storage means for storing the image information presentation document prepared in said presentation preparation means, and presentation listing means for listing the image information presentation documents stored in said presentation storage means.

8. The image information presentation system as claimed in claim 5 or 6, wherein said material storage means also stores a folder of a set of the image information placed in a hierarchical structure, and when images are read and an image information presentation document is prepared with the folder specified, said presentation preparation means makes the hierarchical structure of the templates the same as that of the folder and prepares the image information presentation document.

9. The image information presentation system as claimed in claim 8, further comprising:

presentation hierarchy display means for listing the pages of the image information presentation document in a hierarchical structure and displaying the pages at the same level in overlapping relation.

10. The image information presentation system as claimed in claim 9, further comprising:

edit means for performing editing including exchanging and replacing the image information read into the pages in the hierarchy display state of said presentation hierarchy display means.

11. The image information presentation system as claimed in claim 5, further comprising:

name read means for automatically reading titles of the pages of the templates, wherein said material storage means stores image information with a file name, and said name read means reads the file name of the image information as the title of the page of the template into which the image information is read.

12. An image information presentation method comprising:

the first step of listing from material storage means for storing image information including a still image and a moving image, the image information on display means, the second step of specifying more than one piece of the image information listed at said first step with image specification means, and the third step of reading all image information specified at said second step in batch into templates having related pages of a template as one page into which images are inserted and preparing an image information presentation document by presentation preparation means.

13. The image information presentation method as claimed in claim 12, further comprising:

the fourth step, when the image information pieces specified at said second step are a folder of a set of image information in a hierarchical structure, of making the hierarchical structure of the templates the same as that of the folder, reading the image information, and preparing the image information presentation document by said presentation preparation means.

14. A computer data signal embodied in a carrier wave for executing an image information presentation system, the computer data signal being for executing the steps comprising:

the first step of listing from material storage means for storing image information including a still image and a moving image, the image information on display means, the second step of specifying more than one piece of the image information listed at said first step with image specification means, and the third step of reading all image information specified at said second step in batch into templates having related pages of a template as one page into which images are inserted and preparing an image information presentation document by presentation preparation means.

15. A medium storing an image information presentation system program for executing:

the first step of listing from material storage means for storing image information including a still image and a moving image, the image information on display means, the second step of specifying more than one piece of the image information listed at said first step with image specification means, and the third step of reading all image information specified at said second step in batch into templates having related pages of a template as one page into which images are inserted and preparing an image information presentation document by presentation preparation means.

16. The medium storing the image information presentation system program as claimed in claim 15, wherein said program further comprising:

the fourth step, when the image information pieces specified at said second step are a folder of a set of image information in a hierarchical structure, of making the hierarchical structure of the templates the same as that of the folder, reading the image information, and preparing the image information presentation document by said presentation preparation means.

\* \* \* \* \*